United States Patent
Thoemmes (10) Patent No.: US 8,585,394 B2
(45) Date of Patent: Nov. 19, 2013

(54) COOLING SLEEVE WITH A SUPPORT ELEMENT

(75) Inventor: Helmut Thoemmes, Kastel-Staadt (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 0 days.

(21) Appl. No.: 13/446,399

(22) Filed: Apr. 13, 2012

(65) Prior Publication Data
US 2012/0263820 A1   Oct. 18, 2012

(30) Foreign Application Priority Data
Apr. 15, 2011   (DE) .................. 10 2011 007 553

(51) Int. Cl.
   *B29C 45/73*   (2006.01)
(52) U.S. Cl.
   USPC ........................ 425/526; 425/547; 425/552
(58) Field of Classification Search
   USPC ................... 425/526, 528, 547, 548, 552
   See application file for complete search history.

(56) References Cited

U.S. PATENT DOCUMENTS

| | | | |
|---|---|---|---|
| 5,447,426 A * | 9/1995 | Gessner et al. | 425/526 |
| 5,679,306 A * | 10/1997 | Nakajima et al. | 425/526 |
| 6,190,157 B1 | 2/2001 | Hofstetter | |
| 6,422,855 B1 * | 7/2002 | Dubuis et al. | 425/526 |
| 7,473,093 B1 | 1/2009 | Lachmansingh et al. | |
| 2006/0024607 A1 | 2/2006 | Tanaka et al. | |
| 2007/0264385 A1 | 11/2007 | McCready et al. | |

FOREIGN PATENT DOCUMENTS

| | | |
|---|---|---|
| DE | 19849837 A1 | 5/2000 |
| WO | 9747459 A1 | 6/1997 |
| WO | 2007063063 A1 | 6/2007 |

* cited by examiner

*Primary Examiner* — Tim Heitbrink
(74) *Attorney, Agent, or Firm* — Michael L. Dunn (57) ABSTRACT

A cooling sleeve for receiving a preform comprising a receiving cavity having a receiving opening so that a preform can be inserted into the receiving cavity, and a fluid passage arranged so that when the receiving opening is closed a fluid can be introduced into or removed from the receiving cavity by way of the fluid passage, wherein the cooling sleeve extends along a longitudinal axis and the fluid passage has a passage opening which is arranged near the longitudinal axis and which is arranged opposite the receiving opening. The cooling sleeve allows accelerated cooling of the sprue region of the preform without corresponding noses or markings being formed at the outside of the preform. Arranged in the fluid passage in the region of the passage opening is a support element having a support surface for contacting the preform when the preform is inserted into the cooling sleeve.

16 Claims, 11 Drawing Sheets

COOLING SLEEVE WITH A SUPPORT ELEMENT

CROSS REFERENCE TO RELATED APPLICATIONS

This claims priority from German Patent Application 10 2011 007 553.4 filed Apr. 15, 2011.

BACKGROUND OF THE INVENTION

The present invention concerns a cooling sleeve for receiving a preform produced by injection molding.

Injection molding is one of the most important processes for producing moldings or molded parts. In that case the molding material which is generally originally in the form of powder or granular material is heated, plasticised and pressed under high pressure into a suitable molding tool. The molding material hardens in the molding tool and is then removed from the opened tool.

Commercially usual PET bottles are generally produced by stretch blow molding of a hollow body preform. In that procedure the hollow body preform is produced in a first step by means of an injection molding. The stretch blow molding operation which follows the injection molding process can be effected either immediately after production of the hollow body preform or at a later time.

Production of the corresponding injection molding molds necessitates a high level of complication and expenditure, wherein the injection molding mold on the one hand has to be designed for very high pressures, while on the other hand it must also have suitably heated and/or cooled passages.

Usually an injection molding tool for the production of PET preforms comprises a multiplicity of, for example 192 cavities, into which tool cores of a suitable configuration are introduced. When the tool is closed, that is to say when the core is inserted into the corresponding cavity, a space, the so-called molding space, is formed between the core on the one hand and the cavity on the other hand. The plasticised plastic material, for example PET, is then injected into that space under high pressure. As soon as the PET preform has sufficiently cooled down the mold can be opened and the preform removed. The PET preforms have an open end at which a male screwthread is formed, and a closed end. Generally the feed of the plasticised molten material is effected by way of a sprue arranged at the outside of the closed end of the preform. Due to the production procedure involved therefore a substantially disk-shaped sprue remains at the outside of the preform in the bottom region.

To reduce the cycle times, that is to say the time from one injection operation to the next, it is already usual for the preform to be removed from the mold at a very early time, at which the preform is already solid at its outside surfaces, while however the internal region thereof, the so-called core portion, is still liquid. In that condition the preform is generally transferred into a so-called receiving plate comprising a group of cooling sleeves with receiving cavities. Thus for example in the so-called horizontal tools, that is to say those injection molding tools which open by a horizontal movement of the one tool portion relative to the other, it is usual to already open the tool mold after for example eight seconds, to introduce a receiving plate with corresponding cooling sleeves into the mold, to transfer the individual preforms into the cooling sleeve, to move the receiving plate with the preforms out of the tool, to close the mold again and to begin the next injection molding process. During the next injection molding process the previous preforms remain in the cooling sleeves which are usually cooled.

The cooling sleeves have receiving cavities with an open and a closed end, the internal shape of which substantially corresponds to the external shape of the preform. To ensure that the preform is completely received in the receiving cavity they generally have a fluid passage so arranged that a fluid, generally air, can be introduced into the receiving cavity or removed from the receiving cavity by way of the fluid passage when the receiving opening is closed, that is to say for example with the preform fitted into the receiving opening. The fluid passage is generally disposed at the closed end of the receiving cavity in the region of the central longitudinal axis of the cooling sleeve. Either the air can be sucked away by way of that fluid passage in order to suck the preform fitted into the receiving opening completely into the receiving cavity and hold it there, or air can be introduced into the receiving cavity by way of the fluid passage in order to drive the preform out of the receiving cavity after cooling thereof has occurred.

As the fluid passage has a passage opening arranged on the longitudinal axis, the result of this is that, with a preform fitted into the receiving cavity, the preform does not involve direct contact with the receiving cavity in the region of the passage opening, that is to say in its bottom region, and the result of this is that that region is cooled markedly worse than the regions which have direct contact with the receiving cavity.

As however in production of the PET preforms the sprue is arranged at the outside of the preform at the bottom, the preform, due to the sprue, is somewhat thicker precisely at the location at which it is not in direct contact with the receiving cavity, than the other portions. After removal from the injection molding mold the sprue is the hottest point of the preform as it is here that hot molten material was last supplied at the end of the post-pressure step. Therefore it is just precisely the hottest portion which at the same time is somewhat thicker and would therefore have to be cooled more greatly, that involves the least cooling in the known configurations so that cooling of the bottom region, in particular in the region of the sprue, can be the factor limiting the cooling cycle. In addition, if the preform is still very soft upon transfer, that can involve deformation of the sprue if air is evacuated by way of the fluid passage.

Particularly if air is sucked away by way of the fluid passage a part of the still liquid PET can be sucked into the passage opening of the fluid passage at the outside of the preform as soon as the preform covers the passage opening so that root-shaped "noses", so-called "carrots" are formed, which lead to visual impairment of the PET bottle produced by means of stretch blow molding.

To reduce the cooling cycle time the attempt has therefore already been made to arrange the fluid passage in decentral relationship so that it does not end in the region of the sprue. Nonetheless here too markings occur at the outside of the preform, caused by the opening of the fluid passage. Such markings however are undesirable.

BRIEF SUMMARY OF THE INVENTION

Based on the described state of the art therefore the object of the present invention is to provide a cooling sleeve which allows accelerated cooling of the sprue region of the preform without corresponding noses or markings being formed at the outside of the preform.

According to the invention that object is attained in that arranged, in the fluid passage in the region of the passage opening, is a support element having a support surface that is provided for coming into contact with the preform when the preform is inserted into the cooling sleeve.

The fact that a support surface that is in contact directly with the sprue region of the preform is provided in the passage opening means that the sprue region can be markedly more greatly cooled.

More particularly, the invention is a cooling sleeve for receiving a preform having a receiving cavity with a receiving opening by way of which a preform can be inserted into the receiving cavity, and a fluid passage which is so arranged that when the receiving opening is closed a fluid can be introduced into the receiving cavity or removed from the receiving cavity by way of the fluid passage; wherein, the cooling sleeve extends along a longitudinal axis and the fluid passage has a passage opening which is arranged on or in the proximity of the longitudinal axis and which is arranged opposite the receiving opening, and, arranged in the fluid passage in the region of the passage opening, is a support element having a support surface which is provided for coming into contact with the preform when the preform is inserted into the cooling sleeve.

BRIEF DESCRIPTION OF THE SEVERAL VIEWS OF THE DRAWINGS

Further advantages, features and possible uses of the present invention will be apparent from the description hereinafter of two embodiments and the related Figures in which.

DETAILED DESCRIPTION OF THE INVENTION

In an embodiment the support element has a deflection element for the fluid, which is of such a configuration that fluid which flows at the side remote from the support surface substantially along the longitudinal axis onto the deflection element is guided radially outwardly around the support surface. Because the preform is of a greater wall thickness in the region of the sprue, a small gap is formed between the preform and the cooling sleeve, even when the preform is completely received in the cooling sleeve, in a region surrounding the sprue. The fluid is best supplied and discharged by way of that gap to avoid nose formation.

Although therefore the support surface is in direct contact with the preform, this arrangement nonetheless ensures that the fluid can flow around or through the support element to ensure that the preform is securely and reliably received in the receiving cavity and the preform is reliably delivered out of the receiving cavity.

In principle it would also be conceivable for the support element and in particular the support surface to be made from a porous material so that the support element is both provided for good thermal contact with the preform and also serves for the supply and discharge of the fluid.

To achieve optimum support and cooling for the sprue surface of the preform the support surface is best so arranged that the longitudinal axis of the cooling sleeve extends through the support surface.

In a particularly preferred embodiment the support element is substantially disk-shaped having a first surface which has the support surface, a second surface which is arranged opposite the first surface, and a peripheral surface connecting the first and second surfaces together. The disk best has at least one eccentric through opening which connects the first and second surfaces together and/or at least one groove extending in the axial direction in the peripheral surface. The fluid can then be removed from or introduced into the receiving cavity through one or more through openings without the cooling effect being reduced in respect of the sprue surface. The grooves extending in the axial direction in the peripheral surface act in the same way. The disk-shaped support element can be fitted for example into the fluid passage of circular cross-section.

The fluid passage is advantageously of a stepped configuration, with a portion of larger cross-section and a portion of smaller cross-section, wherein the portion of smaller cross-section opens into the receiving cavity and the support element is disposed in the portion of larger cross-section.

That configuration can ensure good contact between the support element on the one hand and the cooling sleeve on the other hand so that the support element is cooled by way of the cooling sleeve, which leads to effective cooling of the sprue portion of the preform.

Furthermore it is advantageous if the portion of larger cross-section has a female screwthread and there is provided a threaded sleeve having a male screwthread, which can be screwed into the portion of larger cross-section so that the support element is arranged between the portion of smaller cross-section and the threaded sleeve.

In a further preferred embodiment the support element is adapted to be movable so that it is reciprocatable between a support position in which the support element is arranged in the passage opening and an ejection position in which the support element is arranged at least in part within the receiving cavity. In this embodiment the support element can serve at the same time for promoting the ejection step after cooling of the preform has occurred within the receiving cavity. It is then even possible to dispense with the supply of compressed air by way of the fluid passage.

In a further preferred embodiment it is provided that the support element is prestressed in the direction of the receiving cavity by means of an elastic element. That ensures that the support element is in good contact with the sprue region of the preform.

According to the invention the cooling sleeve is used together with an injection molding tool for the production of preforms having at least one core and at least one cavity, wherein the tool has a closed position in which the core is arranged in the cavity and an open position in which the core is arranged outside the cavity. Then a mold space is formed in the closed position between the core on the one hand and the cavity on the other hand, the internal contour of the mold space corresponding to the external shape of the preform to be produced, wherein there is provided a sprue passage having a mouth opening in the mold space, by way of which plasticised molten material can be fed into the mold space. Advantageously the passage opening of the fluid passage of the cooling sleeve is larger than the mouth opening of the sprue passage. The consequence of this is that the sprue of the preform does not close the passage opening of the fluid passage so that the fluid can be supplied or sucked away laterally at the sprue region of the preform.

Alternatively or in combination therewith the support surface of the support element of the cooling sleeve can be smaller than the mouth opening of the sprue passage. In that case the complete sprue region of the preform does not lie on the support surface of the support element.

Reference may be had to the drawings for further detailed description of the invention.

As seen in the drawings, in the embodiments shown in FIGS. 1-5d, the support element 6, 12' has a deflection element 14a, 14a' for the fluid, which is of such a configuration that fluid, which flows at the side 14a, 14a', remote from the support surface substantially along the longitudinal axis, onto the deflection element is guided radially outwardly around the support surface. Because the preform is of a greater wall thickness in the region of the sprue, a small gap is formed between the preform and the cooling sleeve, even when the preform is completely received in the cooling sleeve, in a region surrounding the sprue. The fluid is best supplied and discharged by way of that gap to avoid nose formation.

Although the support surface is in direct contact with the preform, this arrangement nonetheless ensures that the fluid can flow around or through the support element to ensure that the preform is securely and reliably received in the receiving cavity and the preform is reliably delivered out of the receiving cavity.

Figure 1:
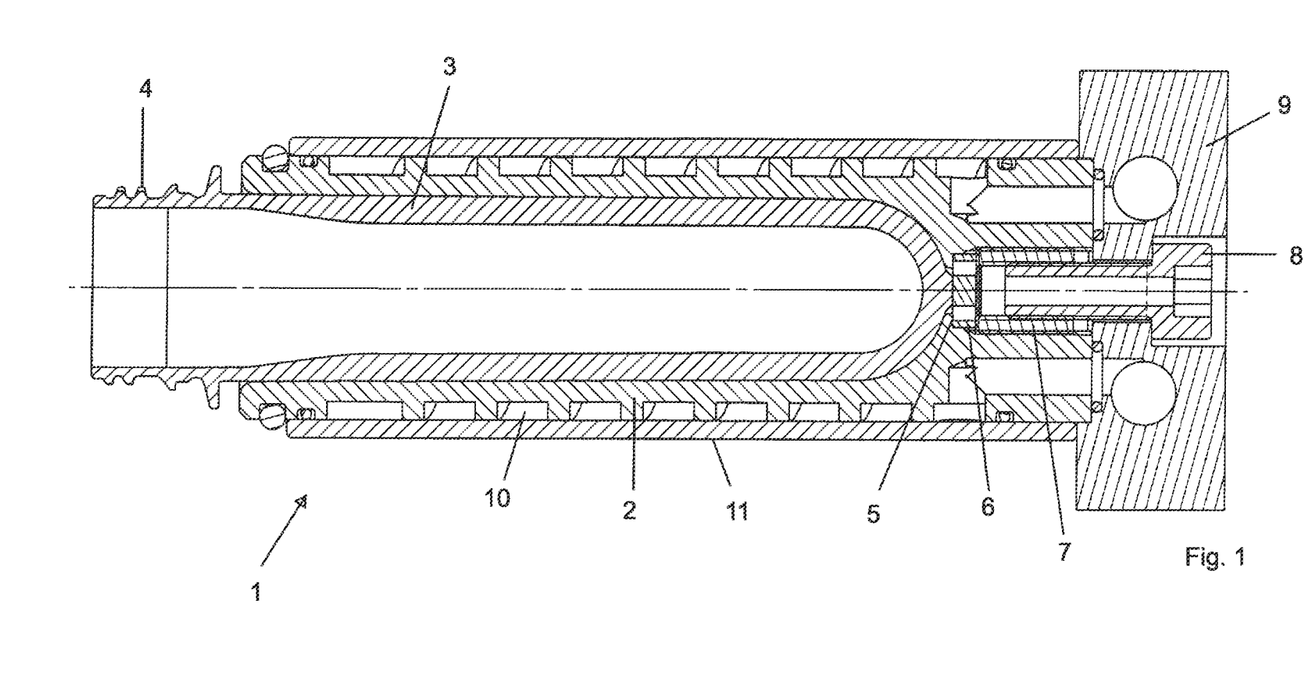
FIG. 1 shows a sectional view through a first embodiment of the invention with inserted preform.

FIG. 1 shows a first embodiment of the cooling sleeve 1 according to the invention. The cooling sleeve 1 has an outer casing 11 and an inner portion 2, wherein the inner portion 2 has a peripherally extending groove at the outside so that a cooling passage 10 is provided between the outer casing 11 and the inner portion 2. The inner portion 2 has a receiving cavity in which the preform 3 is inserted. The preform 3 has a threaded portion 4 arranged outside the receiving cavity. At its outside in the bottom portion, that is to say at the end opposite to the threaded portion 4, the preform 3 has a portion 5 of increased wall thickness. That is the sprue region as, when the injection molding tool is filled with plasticised molten material, the molten material is passed by way of that sprue region. Because of the larger wall thickness of the preform in that region, more heat must be removed here from the preform. Therefore the first embodiment has a support element 6 shown in detail in FIGS. 2a and 2b.

Figure 2A:
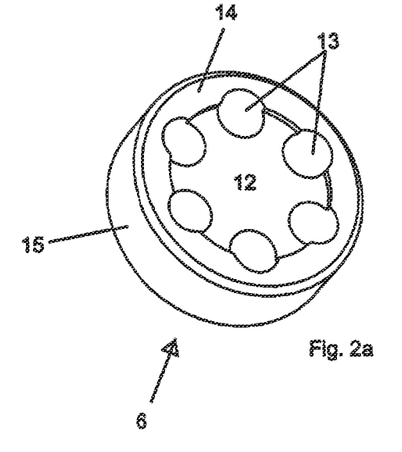
FIGS. 2a and 2b show a perspective view and a sectional view through the support element according to the invention of the first embodiment.
Figure 2B:
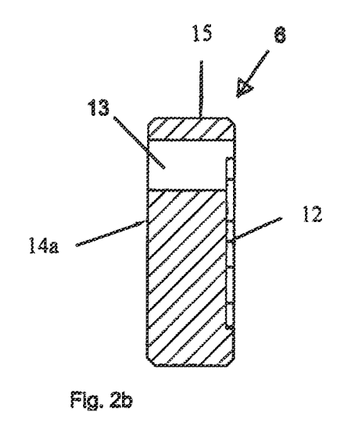

FIG. 2a shows a perspective view and FIG. 2b shows a sectional view through the support element 6. The support element 6 is of a substantially disk-shaped structure and has a first surface 14, a second surface (not shown) and peripheral surfaces 15 which connect the first surface 14 and the second surface together. Arranged in the first surface 14 is the support surface 12 which is to come into contact with the sprue region 5 of the preform. To permit a feed and discharge of fluid into and out of the receiving cavity the disk-shaped support element 6 has six through bores 13, through which the fluid can be supplied and discharged.

The support surface 12 is slightly set back with respect to the upper surface 14 so that there is a small step between the support surface 12 and the upper surface 14. In principle the support element 6, in the form of the apertured disk, can also be used turned through 180° so that the side of the apertured disk 6, which does not have a stepped surface, serves as the support surface, as can be seen from FIG. 1. The possibility of turning the apertured disk 6 means that the cooling sleeve can be adapted to preforms with sprue regions of differing thicknesses.

Figure 3A:
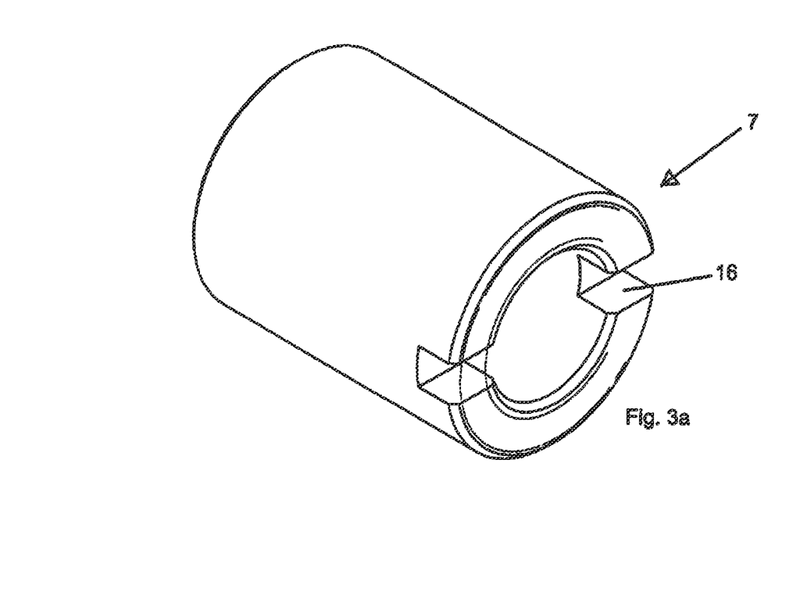
FIGS. 3a and 3b show a perspective view and a sectional view through the threaded sleeve of the first embodiment.
Figure 3B:
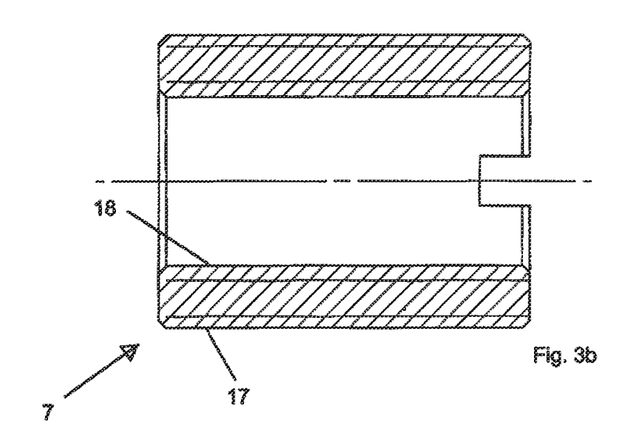

As can be seen from FIG. 1 the inner portion 2 at its closed end, has a stepped bore having a portion of smaller cross-section and a portion of larger cross-section. The portion of larger cross-section is of a cross-section substantially corresponding to the outside diameter of the support element 6. To hold the support element 6 within the stepped bore there is a threaded sleeve 7 shown in detail in FIGS. 3a and 3b. FIG. 3a shows a perspective view of the threaded sleeve 7 and FIG. 3b shows a sectional view. The threaded sleeve 3a has a male screwthread 17 and a female screwthread 18. In addition the sleeve 7 has two recesses 16 of such a configuration that the threaded sleeve can be screwed by means of a conventional screw driver into the portion of larger cross-section of the inner portion 2, the larger-section portion being provided with a female screwthread.

Therefore the support element 6 is held in the position shown in FIG. 1 by the threaded sleeve 7.

To fix the cooling sleeve 1 to a corresponding receiving plate 9 there is provided a hollow screw 8. Fluid, generally air, can be supplied to and discharged from the receiving cavity by way of the receiving plate 9, by way of the hollow screw 8, the threaded sleeve 7 and the through openings 13 in the support element 6.

In this embodiment the mouth opening of the fluid passage is somewhat larger than the sprue so that there is a small gap between the mouth opening, the support element, the sprue region and the preform. That prevents noses being formed at the outside of the preform when suction is applied to the preform.

Figure 4:
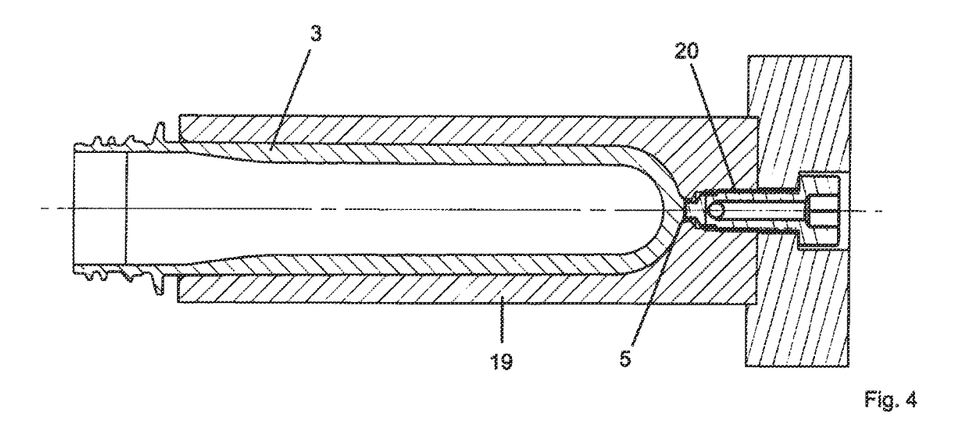
FIG. 4 shows a sectional view through a second embodiment of the invention with inserted preform.

FIG. 4 shows a sectional view through a second embodiment of the invention. The same components are denoted by the same references. Here however the support element 12', in the region of the sprue region 5, is implemented by means of a screw 20 of a a special design configuration.

Figure 5A:
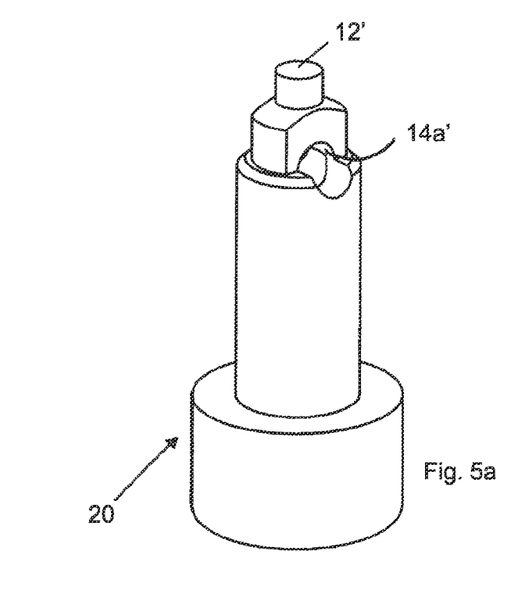
FIGS. 5a through 5d show a perspective view, a plan view and two sectional views of the hollow screw according to the invention of the second embodiment of the invention.
Figure 5B:
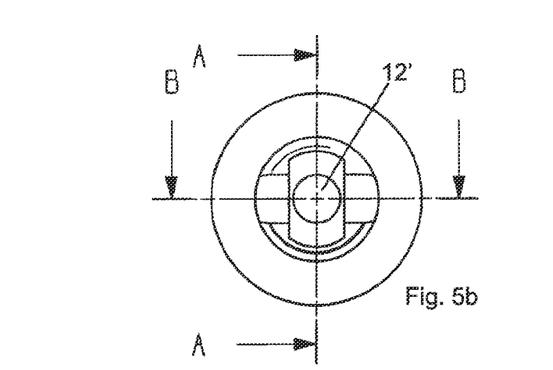
Figure 5C:
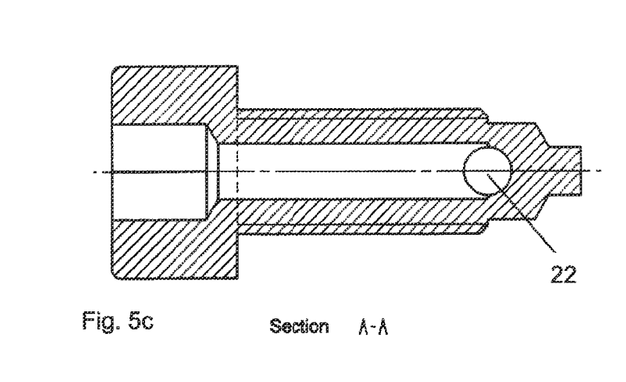
Figure 5D:
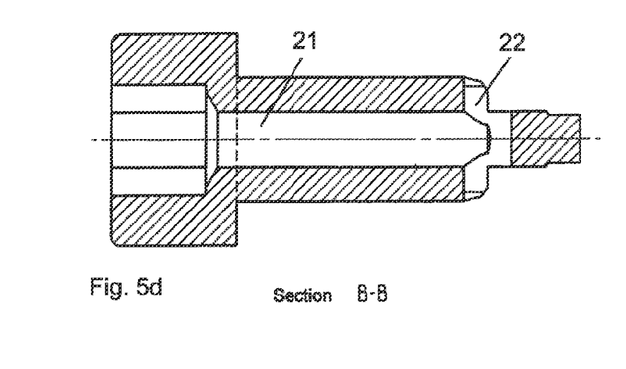

The precise structure of the screw 20 can be seen from FIGS. 5a through 5d. FIG. 5a shows a perspective view of the screw, the screw head being arranged downwardly in the drawing and the support element 12' being arranged at the side of the screw, that is remote from the screw head. FIG. 5b shows a plan view from above of the screw according to the invention. FIGS. 5c and 5d show two mutually perpendicularly arranged longitudinal sections along lines a-a and b-b respectively in FIG. 5b.

The support element 6 is in the form of a hollow screw, that is to say there is a central through passage 21 extending from the screw head in the direction of the support element 12'. It will be noted however that the passage 21 is not taken to the tip of the screw 20, but is prolonged outwardly by way of the passages 22 introduced transversely relative to the longitudinal bore 21 so that the cooling fluid can flow around the support element 12' by way of the passage 21 and the passage 22 so that fluid can be fed into and discharged from the receiving cavity without contact between the preform 3 on the one hand and the support surface 12' having to be given up.

In this embodiment the support surface 12' is smaller than the sprue region 5 so that a small gap remains between the support surface, the sprue region and the mouth opening of the fluid passage, through which gap the fluid can be discharged or supplied without involving the formation of noses on the outside of the preform.

Figure 6:
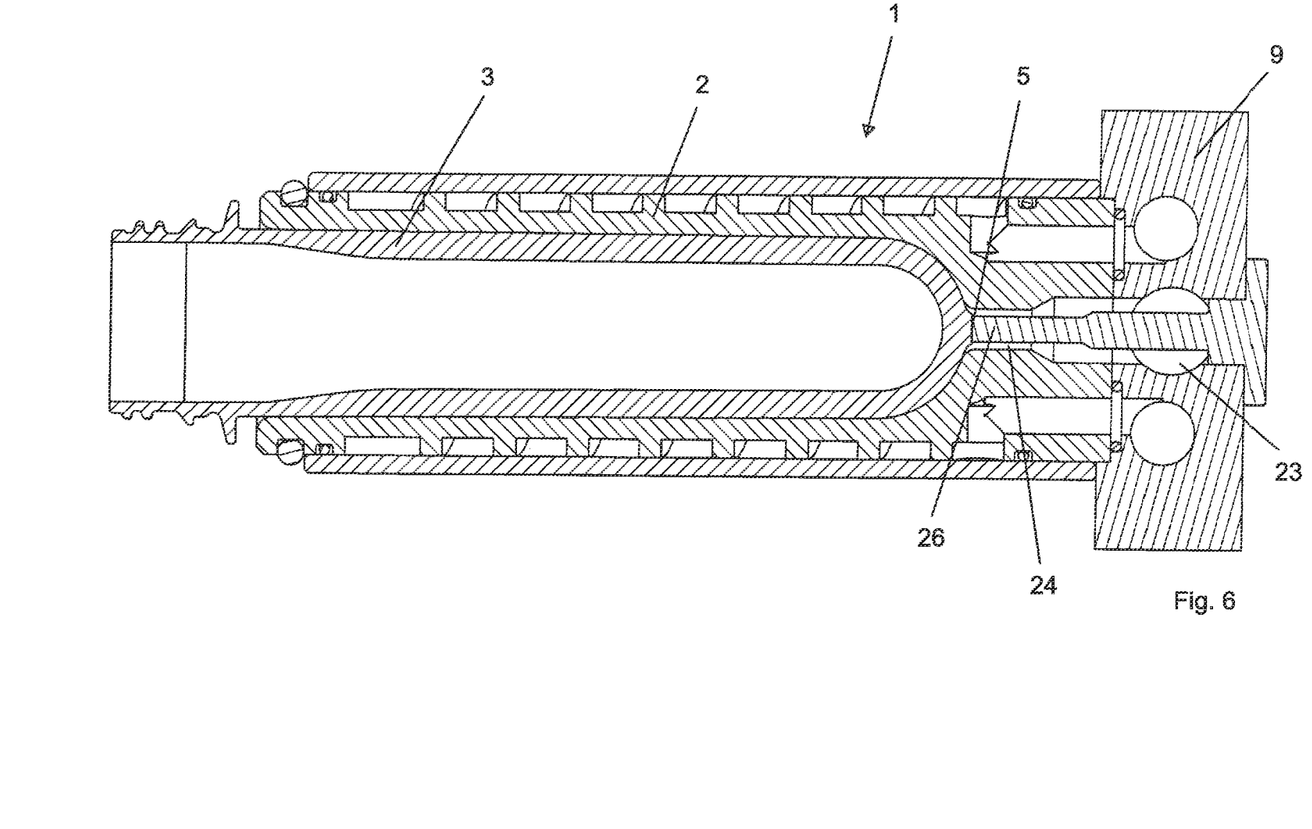
FIG. 6 shows a sectional view of a third embodiment of the invention with inserted preform.

FIG. 6 shows a sectional view of a third embodiment of the invention. Here the support element 6 comprises a post arranged substantially centrally within the fluid passage. The surface of the post, that is towards the preform 3, is the support surface which here is somewhat smaller than the sprue region 5 of the preform 3. In addition the opening of the fluid passage is somewhat larger than the sprue region 5 so that there is an annular space 24 between the support element 26 on the one hand and the fluid passage on the other hand. The fluid passage 23 which extends perpendicularly to the plane of the paper in FIG. 6 is used for the feed and discharge respectively of the fluid. The fluid which is supplied and discharged firstly flows around the support element 26 and is then passed in the direction of the longitudinal axis through the annular space 24.

Figure 7:
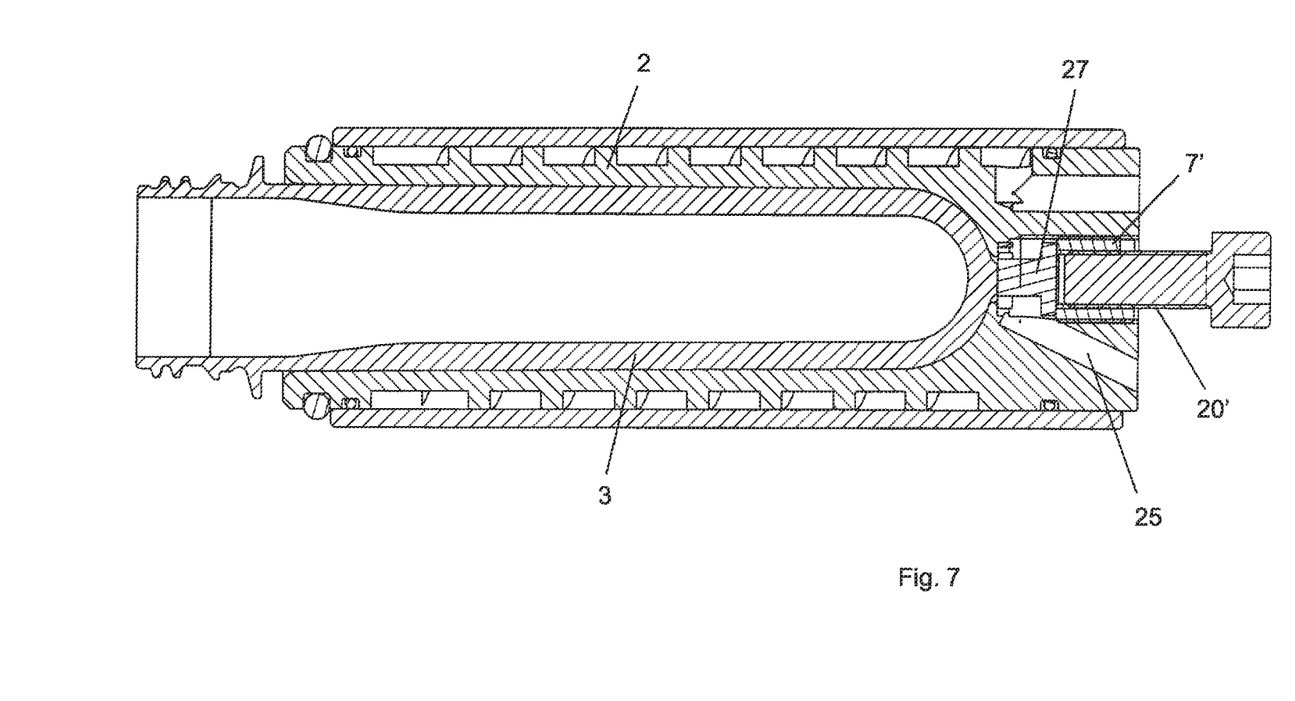
FIG. 7 shows a sectional view of a fourth embodiment of the invention with inserted preform.
Figure 8A:
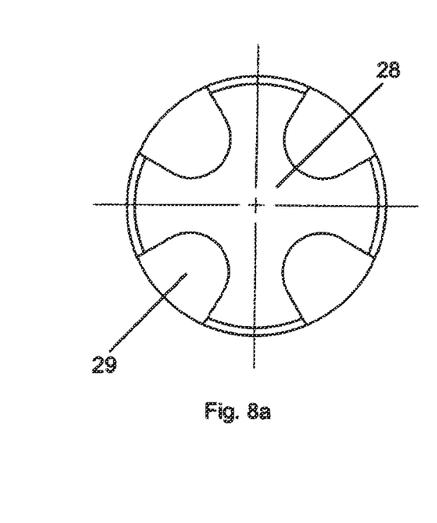
FIGS. 8a through 8c show a plan view, a sectional view and a perspective view of the support element of the fourth embodiment of the invention.
Figure 8B:
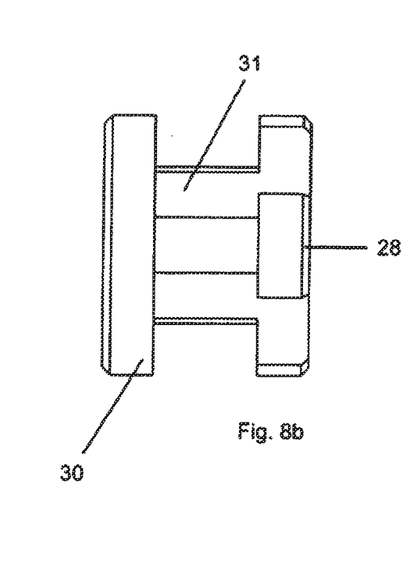
Figure 8C:
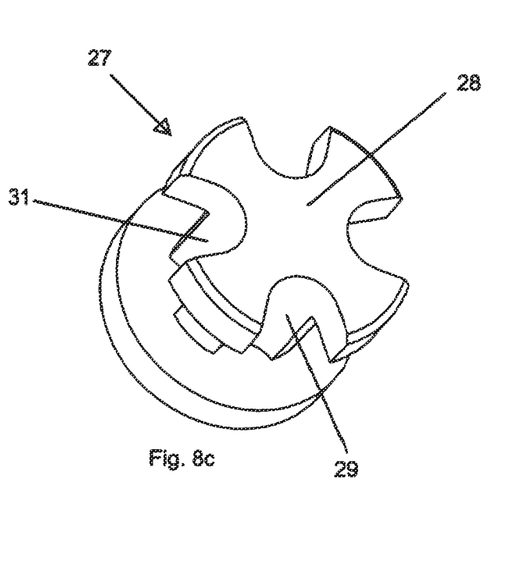

FIGS. 7 and 8 show a fourth embodiment of the invention.

Here the fluid is supplied by way of the fluid passage 25 not centrally but "inclinedly". The support element 27 which is shown in detail in FIGS. 8a through 8c is of such a configuration that it forms an annular space for receiving the fluid supplied by way of the passage 25, the annular space being connected to the passage opening to the receiving cavity by way of four grooves 29.

As can be seen in particular from FIGS. 8a through 8c the support element comprises an end plate 30 which closes a fluid communication in relation to the positioning bore in which the threaded sleeve 7' and the screw 20' are arranged in order to hold the support element 27 in its position.

The support element 27 further has a disk-shaped surface containing the support surface 28. Provided in that surface are four grooves 29 which provide a fluid communication between the fluid passage 25 and the receiving cavity. The disk-shaped element is connected to the end plate by way of suitable connecting ribs 31.

Figure 9:
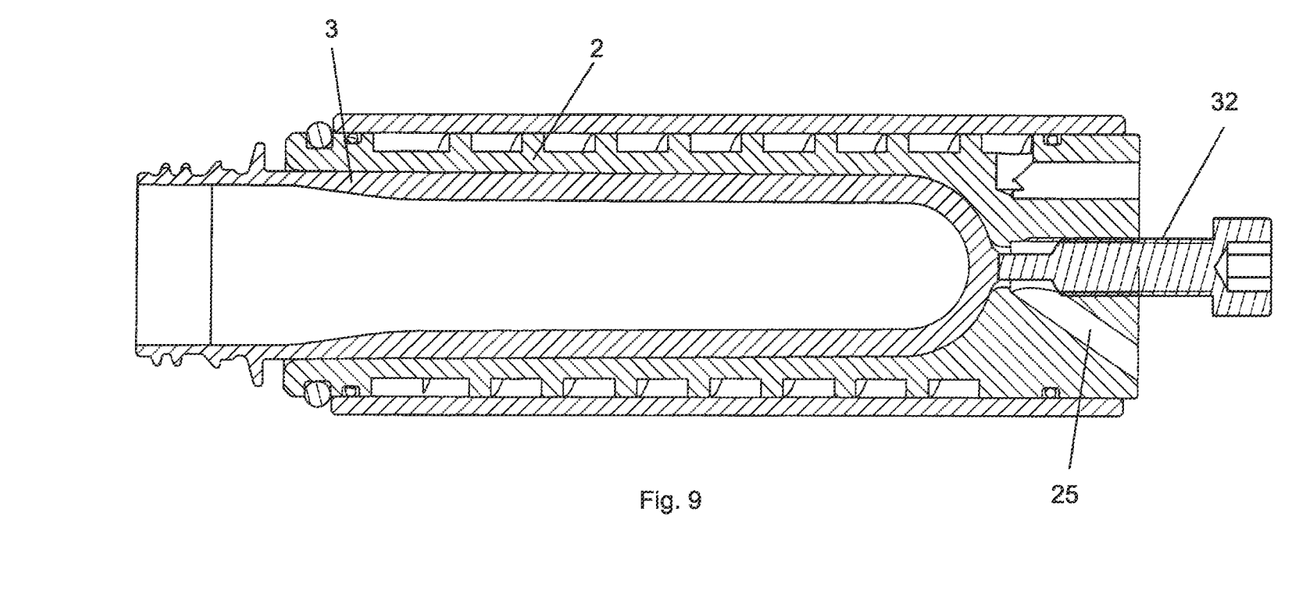
FIG. 9 shows a sectional view of a fifth embodiment of the invention with inserted preform.
Figure 10A:
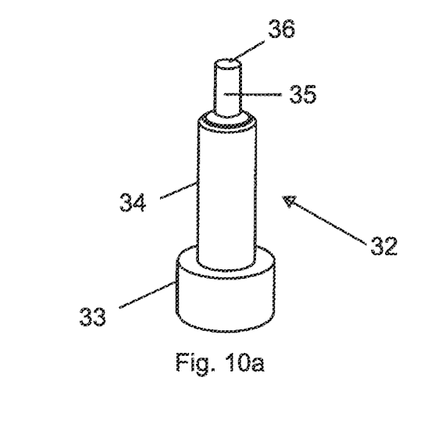
FIGS. 10a through 10c show a perspective view, a plan view and a sectional view of the support element of the fifth embodiment of the invention.
Figure 10B:
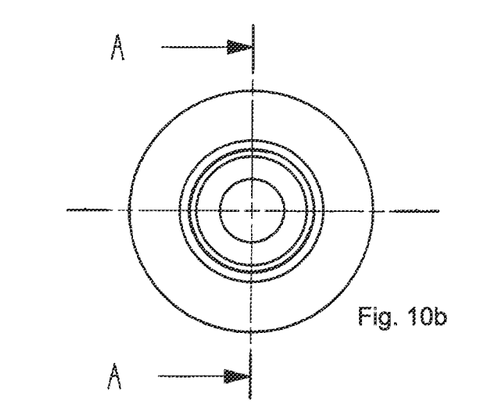
Figure 10C:
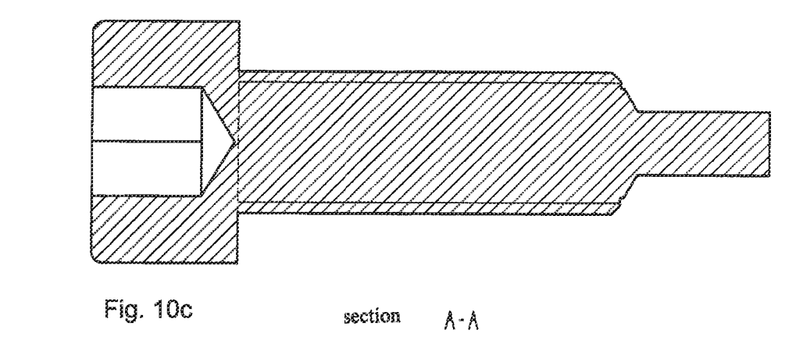

FIGS. 9 and 10 show a fifth embodiment of the invention. This embodiment is highly similar to the embodiment shown in FIG. 6, but in this case the fluid supply is by way of the fluid passage 25.

The support element in the form of a screw 32 is shown in detail in FIGS. 10a through 10c.

FIG. 10a shows a perspective view of the screw. FIG. 10b shows a view from above of the screw and FIG. 10c shows a sectional view along line A-A in FIG. 10b.

The screw 32 comprises a screw head 33 having a suitable opening for actuation of the screw, and a threaded portion 34 having a male screwthread, and a pin portion 35 having the support surface 36. As can be seen in particular from FIG. 9 the support surface 36 is somewhat smaller than the sprue region 5 of the preform 3. In this case also the fluid is introduced into an annular space by way of the passage 25 and from there passed into the receiving cavity.

Figure 11A:
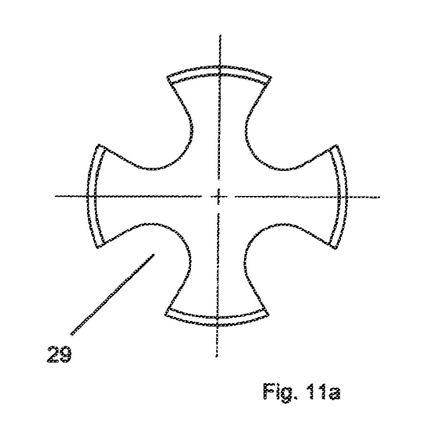
FIGS. 11a through 11c show two plan views and a perspective view of a support element of a sixth embodiment of the invention.
Figure 11B:
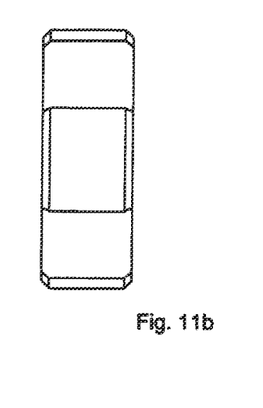
Figure 11C:
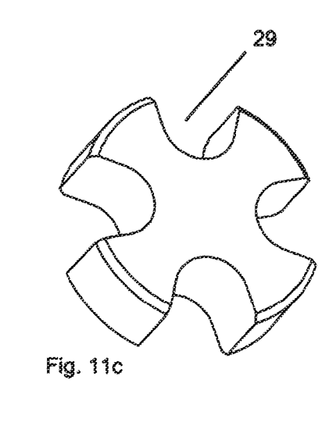

Finally FIGS. 11a through 11c show an alternative support element. This can be used for example in place of the support element shown in FIGS. 2a through 2c. The difference between the embodiments is essentially that the embodiment shown in FIGS. 11a through 11c does not have any through bores, but grooves. All embodiments implement effective cooling.

LIST OF REFERENCES 1 cooling sleeve
2 inner portion
3 preform
4 threaded portion
5 sprue region
6 support element
7, 7' threaded sleeve
8 hollow screw
9 receiving plate
10 cooling passage
11 outer casing
12 support surface
12' support element
13 through openings
14 upper surface
14a deflection element/side remote from support surface
14a' deflection element/side remote from support surface
15 peripheral surfaces
16 recesses
17 male screwthread
18 female screwthread
19 cooling sleeve
20, 20' screw
21 passage
22 passage
23 fluid passage
24 annular space
25 fluid passage
26 post
27 support element
28 support surface
29 grooves
30 end plate
31 connecting rib
32 screw

What is claimed is:

1. A cooling sleeve for receiving a preform comprising a receiving cavity having a receiving opening by way of which a preform can be inserted into the receiving cavity, and a fluid passage which is so arranged that when the receiving opening is closed a fluid can be introduced into the receiving cavity or removed from the receiving cavity by way of the fluid passage, wherein the cooling sleeve extends along a longitudinal axis and the fluid passage has a passage opening which is arranged on or in the proximity of the longitudinal axis and which is arranged opposite the receiving opening, wherein, arranged in the fluid passage in the region of the passage opening is a support element having a support surface which is provided for coming into contact with the preform when the preform is inserted into the cooling sleeve.

2. A cooling sleeve as set forth in claim 1 wherein the support surface has a central region and an annular region surrounding the central region, wherein only the annular region has at least one through opening connected to the fluid passage.

3. A cooling sleeve as set forth in claim 1 wherein the support element is substantially disk-shaped having a first surface which has the support surface, a second surface which is arranged opposite the first surface, and a peripheral surface connecting the first and second surfaces together, wherein the disk has preferably at least one eccentric through opening which connects the first and second surfaces together and/or at least one groove extending in the axial direction in the peripheral surface.

4. A cooling sleeve as set forth in claim 1 wherein the support element has a deflection element for said fluid, which is of such a configuration that said fluid which flows at a side remote from the support surface substantially along the longitudinal axis and onto the deflection element is guided radially outwardly around the support surface.

5. A cooling sleeve as set forth in claim 2 wherein the support element has a deflection element for said fluid, which is of such a configuration that said fluid which flows at a side remote from the support surface substantially along the longitudinal axis and onto the deflection element is guided radially outwardly around the support surface.

6. A cooling sleeve as set forth in claim 3 wherein the support element has a deflection element for said fluid, which is of such a configuration that said fluid which flows at a side remote from the support surface substantially along the longitudinal axis and onto the deflection element is guided radially outwardly around the support surface.

7. A cooling sleeve as set forth in claim 1 wherein the longitudinal axis extends through the support surface.

8. A cooling sleeve as set forth in claim 1 wherein the fluid passage is of a stepped configuration, having a portion of larger cross-section and a portion of smaller cross-section, wherein the portion of smaller cross-section opens into the receiving cavity and the support element is arranged in the portion of larger cross-section.

9. A cooling sleeve as set forth in claim 3 wherein the fluid passage is of a stepped configuration, having a portion of larger cross-section and a portion of smaller cross-section, wherein the portion of smaller cross-section opens into the receiving cavity and the support element is arranged in the portion of larger cross-section.

10. A cooling sleeve as set forth in claim 8 wherein the portion of larger cross-section has a female screwthread and there is provided a threaded sleeve having a male screwthread, which can be screwed into the portion of larger cross-section so that the support element is arranged between the portion of smaller cross-section and the threaded sleeve.

11. A cooling sleeve as set forth in claim 1 wherein the support element is reciprocatable between a support position in which the support element is arranged in the passage opening and an ejection position in which the support element is arranged at least in part within the receiving cavity.

12. A cooling sleeve as set forth in claim 1 wherein the support element is prestressed in the direction of the receiving cavity by means of an elastic element.

13. An injection molding tool for the production of preforms having at least one core and at least one cavity and comprising a cooling sleeve according to claim 1 for receiving a produced preform, wherein the tool has a closed position in which the core is arranged in the cavity and an open position in which the core is arranged outside the cavity, wherein a mold space is formed in the closed position between the core on the one hand and the cavity on the other hand, the internal contour of the mold space corresponding to the external shape of the preform to be produced, wherein there is provided a sprue passage having a mouth opening into the mold space, by way of which plasticised molten material can be fed into the mold space.

14. An injection molding tool as set forth in claim 13 wherein the passage opening of the fluid passage of the cooling sleeve is larger than the mouth opening of the sprue passage.

15. An injection molding tool as set forth in claim 13 wherein the support surface of the support element of the cooling sleeve is smaller than the mouth opening of the sprue passage.

16. An injection molding tool as set forth in claim 14 wherein the support surface of the support element of the cooling sleeve is smaller than the mouth opening of the sprue passage.

* * * * *